(12) United States Patent
Balachandran et al.

(10) Patent No.: US 8,149,831 B2
(45) Date of Patent: Apr. 3, 2012

(54) TECHNIQUE FOR PACKET COMPRESSION IN AN APPLICATION LEVEL MULTICAST

(75) Inventors: Krishna Balachandran, Morganville, NJ (US); Katherine Guo, Scotch Plains, NJ (US); Kiran Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 307 days.

(21) Appl. No.: 12/621,831

(22) Filed: Nov. 19, 2009

(65) Prior Publication Data

US 2011/0116503 A1    May 19, 2011

(51) Int. Cl.
*H04L 12/56* (2006.01)

(52) U.S. Cl. ......... 370/390; 370/400; 370/465; 709/247

(58) Field of Classification Search ......................... None
See application file for complete search history.

(56) References Cited

U.S. PATENT DOCUMENTS

| 7,174,385 | B2* | 2/2007 | Li ................................. 709/231 |
| 7,778,273 | B2* | 8/2010 | Luo et al. ...................... 370/465 |
| 2004/0236863 | A1* | 11/2004 | Shen et al. .................... 709/231 |
| 2005/0160184 | A1* | 7/2005 | Walsh et al. ................... 709/247 |
| 2008/0133767 | A1* | 6/2008 | Birrer et al. ................... 709/231 |
| 2010/0150157 | A1* | 6/2010 | Wang et al. .................... 370/392 |
| 2011/0055403 | A1* | 3/2011 | Balachandran et al. ...... 709/227 |

* cited by examiner

*Primary Examiner* — Brian Roberts
(74) *Attorney, Agent, or Firm* — A. Yip

(57) ABSTRACT

In an application level multicast (ALM), multiple flows of data packets containing shared material are destined for different devices. A packet compression device is used to compress the data packets to reduce traffic load. This compression device includes a cache for recording the payloads of selected data packets which currently are not of record in the cache. If it is determined that the cache has therein a record of an identical version of the payload of a data packet, the compression device releases a compressed version of the data packet which includes a representation of the payload in lieu of the actual payload.

20 Claims, 2 Drawing Sheets

100

200

300

400

TECHNIQUE FOR PACKET COMPRESSION IN AN APPLICATION LEVEL MULTICAST

FIELD OF THE INVENTION

The invention relates to a data compression technique and, more particularly, to a technique for compression of data packets in an application level multicast.

BACKGROUND OF THE INVENTION

This section introduces aspects that may help facilitate a better understanding of the invention. Accordingly, the statements of this section are to be read in this light and are not to be understood as admissions about what is prior art or what is not prior art.

Use of application level multicast (ALM) is common in collaborative applications where identical data streams are sent to different endpoints. For example, Microsoft® NetMeeting® is a peer-to-peer collaboration application that allows users to join a session and share windows, desktops, audio and video in an ALM. Based on which participants' IP addresses are called by later entrants when they join the session, NetMeeting® builds a tree for an ALM where either of the first two users in the session serves as the root of the tree. Typically, the user in the session receiving calls from later users becomes their parent in the ALM tree for distribution of multicast data. In the case where all subsequent users place a call to the first user to join a session, the ALM tree becomes a star.

BRIEF SUMMARY

The invention is premised upon the recognition that a collaborative application like NetMeeting® has been designed for a local area network (LAN) environment where availability of bandwidth typically is not a concern. However, where, for example, the bandwidth of access to a network or the bandwidth of the network itself is limited, the media quality of a collaborative session delivered via such a network or access may become a major issue. In one embodiment of the invention, a data compression technique is applied where data packets are received which are attributable to multiple data packet flows destined for different devices, respectively, in an ALM of material to be shared with the different devices. A memory unit (e.g., a cache) is used to record payloads of selected ones of the data packets. A determination is made whether the memory unit has therein a record of an identical version of a payload of a received data packet. The payload of the received data packet is recorded in the memory unit if it is determined that the memory unit has therein no record of an identical version of the payload. Otherwise if it is determined that the memory unit has therein a record of an identical version of the payload, the payload of the received data packet is replaced with a representation of the payload, thereby accomplishing data compression.

DETAILED DESCRIPTION

Figure 1:
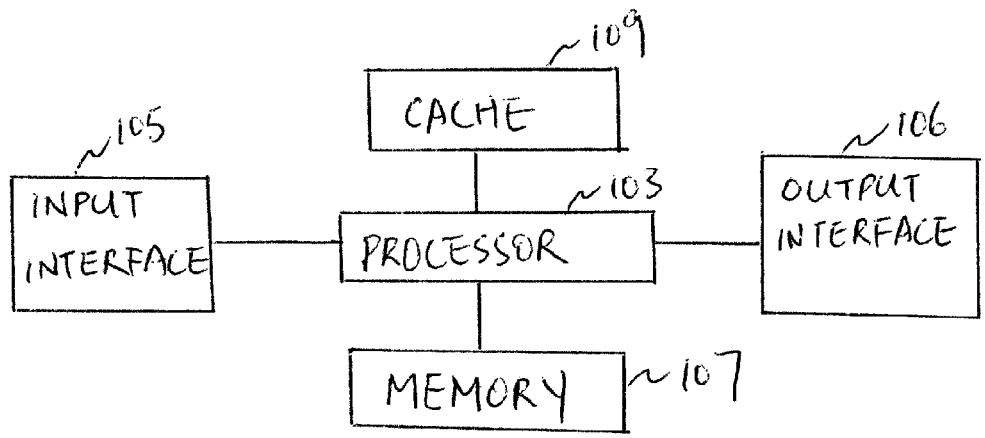
FIG. 1 is a block diagram of a packet compression device in one embodiment of the invention.

FIG. 1 illustrates a packet compression device 100 embodying the principles of the invention. Device 100 is particularly advantageous for use in an application level multicast (ALM). Typically, when a user device participates in a collaboration application (e.g., Microsoft® NetMeeting®) and shares a window, a media segment, etc. via ALM with other participant devices, packets carrying the same payload corresponding to the shared material are sent to the other participant devices, in accordance with an ALM tree. The user device sharing the material may be envisioned as a node of the ALM tree and parent to the other participant devices. Conversely, the other participant devices receiving the shared material may be envisioned as individual nodes of the tree and children to the user device. For example, based on which user devices' IP addresses are called by later entrants when they join a session, NetMeeting® builds an ALM tree where either of the first two user devices in the session serves as the root of the tree. Typically, the user device in the session receiving calls from participant devices later becomes their parent in the ALM tree for distribution of shared material. In particular, where all subsequent participant devices place a call to the first user device to join a session, the ALM tree becomes a star.

In essence, a parent device in an ALM typically transmits multiple flows of packets, containing shared material, destined for different child devices, respectively, where corresponding packets in the respective flows have an identical payload comprising the shared material, read from the same buffer from an application layer of the parent device. These corresponding packets may only differ in their internet protocol (IP) header, transport layer header, e.g., transport control protocol (TCP) header, and, possibly, other headers.

The invention is premised upon the recognition that in an ALM concurrent packet flows from a parent device to child devices may lead to congestion-related quality issues, particularly over wireless links. Importantly, those corresponding packets in the different flows having an identical payload are generated very closely in time. In one embodiment, device 100 is used to effectively lessen traffic congestions caused by the concurrent packet flows in an ALM. As fully described below, device 100 performs data compression on identical packet payloads generated closely in time without changing the packets' IP or transport layer headers. Device 100 may be realized as a hardware device or software device which may be stand-alone or built into other devices.

In one embodiment, packet compression device 100 in FIG. 1 comprises processor 103, input interface 105, output interface 106, memory 107 and cache 109. In another embodiment, device 100 may be a software application, running on a network gateway, access network node, networked computer device (e.g., a workstation, personal computer (PC), desktop, notebook or netbook computer, pocket personal computer (PPC), etc.), smart phone, iPhone®, personal digital assistant (PDA), Blackberry®-type device, Kindle™-type device, set-top box, etc. which includes therein processor 103, interfaces 105 and 106, memory 107 and cache 109.

Figure 2:
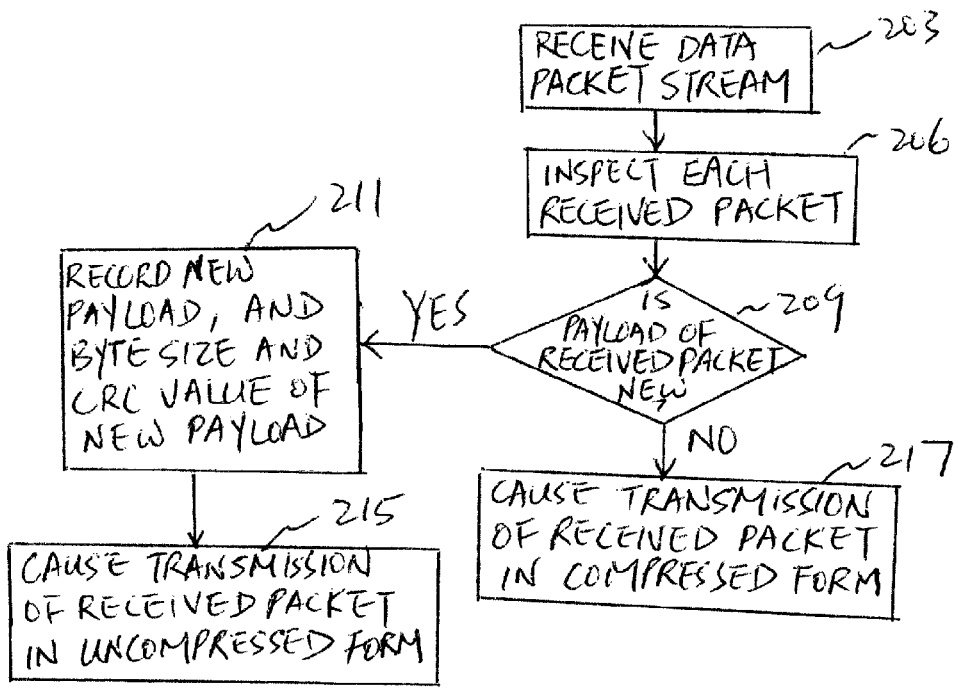
FIG. 2 is a flow chart depicting a process carried out by the device of FIG. 1.

In one embodiment, processor 103, instructed by a packet level compression program stored in memory 107, performs data compression process 200 in FIG. 2 on packets introduced to device 100. Process 200 is fully described hereinbelow. By way of example, but not limitation, device 100 in this instance receives a stream of data packets, through input interface 105, from a parent device (not shown) sharing material with N child devices (not shown) in a collaborative application (e.g., NetMeeting®) via ALM, where N>1. This stream of data packets, denoted 300, results from interleaving data packets in N individual packet flows generated in the parent device which contain the shared material, and which are destined for the N child devices, respectively.

Figure 3:
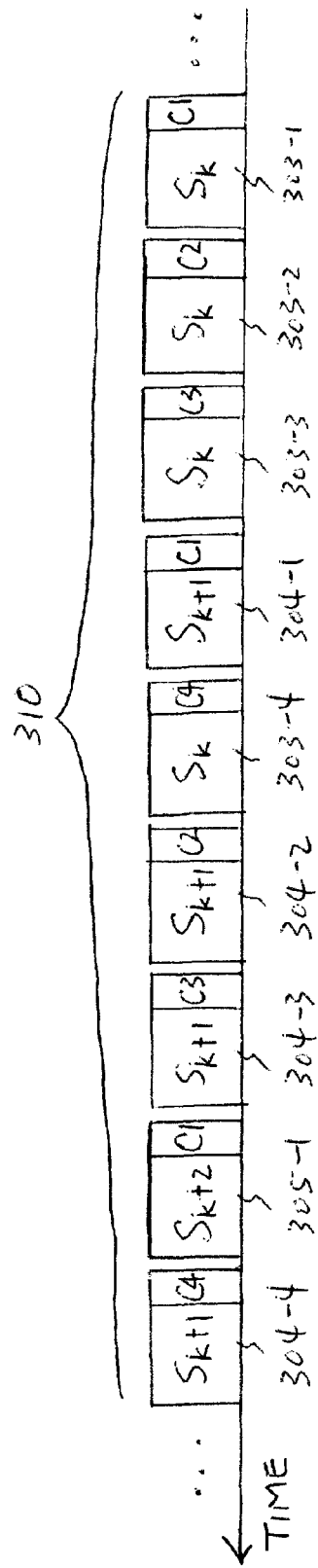
FIG. 3 illustrates a stream of packets to be processed by the device of FIG. 1.

FIG. 3 shows a snapshot of data packet stream 300, resulting in this instance from interleaving N=4 individual data packet flows generated in the parent device. Each data packet in stream 300 can be attributed to one of the four data packet flows based on its address (e.g., IP address) to a child device for which the flow is destined. For simplicity and ease of illustration, each packet in FIG. 3 is shown with a destination address in its TCP/IP header and a transport-layer payload in its body. In addition, the material to be shared with the four child devices is segmented into K segments to facilitate its transportation by packets, where K is an integer. Each segment in this instance is about 1,400 bytes long. For example, packet 303-1 contains in its header an IP address of a first child device (C1) and in its body, among other things, a kth segment of the shared material ($S_k$), where $1 \leq k \leq K$.

In this example, packets 303-1, 303-2, 303-3 and 303-4 contain the same payload $S_k$ and are attributable to the data packet flows to the first, second, third and fourth child devices, respectively. These packets which contain an identical payload (i.e., $S_k$) are referred to as "sister packets" to one another, and comprise an "ensemble." Similarly, packets 304-1, 304-2, 304-3 and 304-4 which contain an identical payload ($S_{k+1}$) are sister packets, and which comprise another ensemble and are attributable to the data packet flows to the first, second, third and fourth child devices, respectively. Because the four data packet flows to the respective four child devices are generated in the parent device closely in time, the sister packets in the same ensemble tend to be contiguous to one another in stream 300, whose contiguity at times is interrupted by other packets from different ensembles. For example, the contiguity of the packets in the kth ensemble is interrupted by packet 304-1 from the (k+1)th ensemble, which in this instance appears between packets 303-3 and 303-4. The contiguity of the packets in the (k+1)th ensemble is interrupted by packet 303-4 which in this instance appears between packets 304-1 and 304-2. It is also interrupted by packet 305-1 from the (k+2)th ensemble which contains a payload $S_{k+2}$, and which in this instance appears between packets 304-3 and 304-4.

In accordance with data compression process 200 in one embodiment, processor 103 of packet compression device 100 receives data packet stream 300 through input interface 105, as indicated at step 203 in FIG. 2. At step 206, processor 103 inspects each received packet for its payload. Processor 103 at step 209 determines whether the payload of the received packet is new, i.e., not currently of record in cache 109. If it is determined that the received packet contains a new payload, processor 103 causes the new payload, among other things, to be recorded in a hash table in cache 109. As is well known, the hash table uses a hash function to map certain identifiers or keys to associated recorded payloads in cache 109. A hash function is used to transform a key into an index (i.e., a hash) of a memory slot where the corresponding new payload is recorded in cache 109. In one embodiment, the hash function used is a well-known cyclic redundancy check (CRC) algorithm, which processor 103 performs on the new payload. Processor 103 at step 211 records the new payload, and its byte size in a memory slot indexed by the resulting CRC value of the new payload, which is also recorded in cache 109. Processor 103 proceeds from step 211 to step 215 where processor 103 causes transmission of the received packet in uncompressed form through output interface 106.

It should be noted at this point that the design of data compression process 200 is premised upon the recognition of having redundancy, i.e., identical payloads, in sister packets in each ensemble. Once the payload of a packet in an ensemble is identified to be new and recorded in cache 109, process 200 reduces the payload redundancy of its sister packets in the same ensemble. As fully described hereinbelow, processor 103 replaces the repeated payload in each subsequent, sister packet with a shorter representation thereof, which references the same payload already recorded in cache 109, thereby accomplishing data compression.

To achieve the maximum number of cache hits, each payload recorded in cache 109 needs to survive any cache overwriting till the arrival of the last sister packet in the same ensemble. Because, as mentioned before, the sister packets in the same ensemble tend to be contiguous to one another, whose contiguity is interrupted by only a few other packets possibly from other ensembles, cache 109 can be advantageously small in size. For instance, in the example of FIG. 3, if the data packet pattern of sequence 310 is representative of data packet stream 300, it can be shown that only two memory slots are required of cache 109 to achieve the maximum number of cache hits. In general, the number of required cache memory slots is small, and may vary with the number of concurrent data packet flows to different child devices (i.e., N). Given the small cache size, the likelihood that cache 109 would contain two or more distinct packet payloads with an identical CRC value is rare. As such, it is appropriate to use one of CRC-16, CRC-24, and CRC-32 values here for indexing the corresponding payload in the hash table, which are 2, 3 and 4 bytes long, respectively.

Referring back to step 209 where processor 103 determines whether the payload of the received packet is new, processor 103 calculates a CRC value of the payload, and also determines the byte size of the payload. Processor 103 then looks for an entry in cache 109 using the calculated CRC value as a memory slot index. If an entry is found in the memory slot indexed by the calculated CRC value, and the size of the entry also matches the byte size of the payload just determined, processor 103 declares a cache hit and that the payload of the received packet is not new. In that case, processor 103 causes transmission of the received packet in compressed form via output interface 106, as indicated at step 217.

If a received packet is to be transmitted in compressed form, processor 103 replaces the original payload of the packet with a representation thereof, leaving many of its remaining parts including most fields within its headers unchanged. However, because the compressed packet may be processed by IP routing devices along its path between compression device 100 and the counterpart decompression device (described below), the IP header of the compressed packet needs to be valid for the compressed packet to be properly routed along the path. For example, the "Total Length" field in the IP header needs to be changed to reflect the change in the IP payload size. On the other hand, for example, the "Checksum" field in the TCP header or the "Total Length" field in the UDP need not be changed which are irrelevant to the routing between the compression and decompression devices, and in fact remain valid after the decompression device restores the original packet for routing it to the destination device. In any event, the replacement representation of the original payload is much shorter than the original payload itself, thereby effectively achieving data compression.

Figure 4:
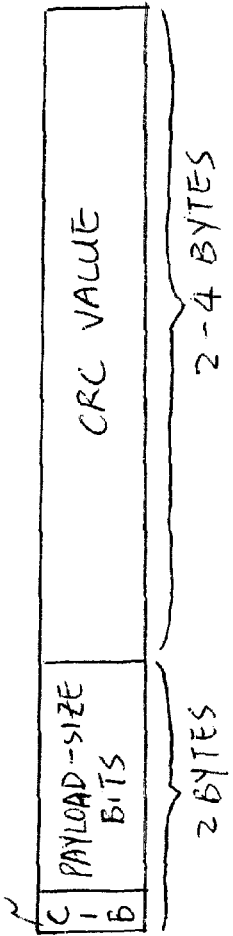
FIG. 4 illustrates a representation of a payload of a compressed packet resulting from the process of FIG. 2.

FIG. 4 illustrates the data format of the replacement representation, denoted 400, in one embodiment. As shown in FIG. 4, the first two bytes of representation 400 are formatted with the most significant bit (MSB) being compression indicator bit (CIB) 403, whose value in this instance is set to "0," indicating that the associated packet is compressed. The following 15 bits indicates the byte size of the original payload being replaced. Since the original payload here is about 1,400 bytes long, the payload-size bits is more than adequate to represent such a byte length and, in fact, any byte-length shorter than $2^{15}$=32,768. These 15 payload-size bits in representation 400 are followed by a CRC value of the original payload which, as explained before, is 2-4 bytes long, depending on which one of the CRC-16, CRC-24, and CRC-32 algorithms is actually used.

If a received packet is to be transmitted in an uncompressed form, in one embodiment processor 103 inserts into the packet a byte immediately after its headers and before the packet payload. The MSB of the inserted byte is a CIB, whose value in this instance is set to "1," indicating that the associated packet is uncompressed. The remaining seven bits of the inserted byte can be set to either "1" or "0" as they are irrelevant to any subsequent processing. Because of the extra, inserted byte, the value of the Total Length field of the IP header needs to be increased by 1 for the uncompressed version.

A packet decompression device (not shown) may be used downstream to recover the original packets from their compressed and uncompressed versions generated by packet compression device 100. In one embodiment, the packet decompression device is structurally identical to device 100, and performs principally the inverse function to device 100. Both compression device 100 and the decompression device build their respective caches as packets pass therethrough such that the cache contents in both devices are identical. However, in the unlikely event that the decompression device is not able to recover a packet, including the packet's original payload, from its compressed version due to a cache discrepancy (e.g., as a result of packet losses or other cache maintenance issues), the decompression device simply contacts device 100 for the original payload stored in the cache of device 100, identifiable by its CRC value and byte size, which have been received in the compressed version.

Specifically, for every received packet, the decompression device examines the CIB of the packet. If the CIB value equals "1," the decompression device determines that the received packet is in uncompressed form. In that case, the decompression device computes the CRC value of the payload of the received packet and determines the byte size of the payload. The decompression device then records in its cache the payload, and the payload byte size in a memory slot indexed by the calculated CRC value, which is also recorded in the cache, in a similar manner to step 211 of data compression process 200 described before. The decompression device also removes from the received packet the aforementioned byte which contains the CIB and which was inserted thereinto by device 100. The decompression device then reduces the value of the Total Length field of its IP header by 1 and releases the resulting packet containing its original payload.

On the other hand, if the value of the CIB of a received packet equals "0," the decompression device determines that the received packet is in compressed form. In that case, the decompression device extracts, from the payload representation of FIG. 4 in the compressed packet, the CRC value of the packet's original payload and data concerning the payload byte size. The decompression device then searches its cache using the CRC value as a memory slot index. If an entry exists in the memory slot as indexed, and the size of the entry matches the byte size of the payload just extracted, the decompression device replaces the payload representation in the compressed packet with the corresponding payload stored in the cache, thereby recovering the original packet. The IP Total Length header field is also modified to reflect the size of the original packet after the recovery process.

The compression ratio achieved by data compression process 200 depends on the number of concurrent flows (N) having identical packet payloads processed by device 100. Let's assume the average payload before compression is U bytes long. The replacement representation of a payload 400 used in a compressed packet is 4-6 bytes long depending on the actual CRC algorithm used, and the combined transport layer and IP header is 40 bytes long. Let's also assume during a unit of time, the number of packets in each flow is R.

Thus, during each unit time, an average of (U+40)NR bytes are generated originally for the N packet flows. Compression device 100 effectively reduces the N flows to a single flow of uncompressed packets and (N−1) flows of compressed packets. As a result, the total number of bytes per unit time generated by device 100 is (U+40+1)R+(N−1)(4+40)R if CRC-16 is used, and (U+41)R+(N−1)(6+40)R if CRC-32 is used.

Thus, if CRC-16 is used, the compression ratio achievable by device 100 is as follows:

$$1-(UR+41R+44(N-1)R)/((U+40)NR)=1-(U+44N-3)/((U+40)N)$$

Similarly, if CRC-32 is used, it can be shown that the compression ratio is 1−(U+46N−5)/((U+40)N).

In a practical example, the average payload size (U) of a NetMeeting® flow is 1,300 bytes. Thus, when CRC-16 is used and there are N=2 concurrent flows, the average compression ratio is (1−(1300+88−3)/2680)=0.483, or 48.3%. On the other hand, if there are N=10 concurrent flows, the compression ratio becomes 87.0%.

It should be noted that the placement of compression device 100 may depend on the actual operational scenario where the collaboration application is used. In one embodiment, the collaboration application user starts a session in a corporate intranet through access networks having a variable delay, and relatively narrow uplink bandwidth afforded, e.g., by WIFI, cable modem, DSL, 3G wireless network, etc. In that embodiment, device 100 is placed either at a gateway of a virtual private network (VPN) through which the user's traffic enters the corporate intranet, or even at the user's device, e.g., his/her desktop PC, thereby alleviating traffic load on the access links.

In another embodiment, the collaborative application user is within the corporate intranet and other participants joining the collaborative session are located in the same branch office over a wide area network (WAN). Compression device 100 may be positioned at the gateway to the branch office, thereby alleviating traffic load across the WAN. In general, the decompression device is advantageously placed at the other end of the link which is more susceptible to traffic congestion than the rest of the network.

The foregoing merely illustrates the principles of the invention. It will thus be appreciated that those skilled in the art will be able to devise numerous arrangements which embody the principles of the invention and are thus within its spirit and scope.

For example, it will be appreciated that packet compression device 100 and its decompression device counterpart disclosed herein may be used in combination with other data or packet compression/decompression devices to further reduce traffic load.

In addition, in the disclosed embodiments, Microsoft® NetMeeting® is illustratively used as an example only. It will be appreciated that a person skilled in the art may use a different collaborative application, instead, to exploit the invention.

Finally, although device 100, as disclosed, is embodied in the form of various discrete functional blocks, such a device could equally well be embodied in an arrangement in which the functions of any one or more of those blocks or indeed, all of the functions thereof, are realized, for example, by one or more processors or devices.

What is claimed is:

1. A data compression apparatus, comprising:
    an interface for receiving data packets attributable to a plurality of data packet flows destined for different devices, respectively, in an application level multicast (ALM) of material to be shared with the different devices;
    a memory unit for recording a plurality of payloads of selected ones of the data packets; and
    a processing unit configured to determine whether the memory unit has therein a record of an identical version of a payload of a received data packet, the payload of the received data packet being recorded in the memory unit if it is determined that the memory unit has therein no record of an identical version of the payload, and the payload of the received data packet being replaced with a representation of the payload if it is determined that the memory unit has therein a record of an identical version of the payload.

2. The apparatus of claim 1 wherein the material is shared in accordance with a collaborative application.

3. The apparatus of claim 1 wherein at least one of the plurality of payloads is recorded in the memory unit using at least a result of a hash calculation of the at least one payload.

4. The apparatus of claim 3 wherein the hash calculation comprises a cyclic redundancy check (CRC) calculation.

5. The apparatus of claim 3 wherein the at least one payload is recorded in the memory unit using also the size of the at least one payload.

6. The apparatus of claim 1 wherein the representation of the payload comprises a result of a cyclic redundancy check (CRC) calculation of the payload.

7. The apparatus of claim 6 wherein the representation of the payload also comprises an indication of the size of the payload.

8. The apparatus of claim 1 wherein the memory unit comprises a cache.

9. A data compression apparatus, comprising:
    an input interface for receiving data packets attributable to a plurality of data packet flows destined for different devices, respectively, in an application level multicast (ALM) of material to be shared with the different devices;
    a memory unit for recording a plurality of payloads of selected ones of the data packets; and
    a processing unit configured to determine whether the memory unit has therein a record of an identical version of a payload of a received data packet;
    an output interface for sending a data packet derived from the received data packet, the derived data packet including the payload of the received data packet and an indication that the derived data packet is in uncompressed form if it is determined that the memory unit has therein no record of an identical version of the payload, and the derived data packet including a representation of the payload of the received data packet and an indication that the derived data packet is in compressed form if it is determined that the memory unit has therein a record of an identical version of the payload.

10. The apparatus of claim 9 wherein the payload of the received data packet is recorded in the memory unit if it is determined that the memory unit has therein no record of an identical version of the payload.

11. The apparatus of claim 10 wherein the payload of the received data packet is recorded in accordance with a hash table format.

12. The apparatus of claim 11 wherein a result of a cyclic redundancy check (CRC) calculation of the payload is used as an index of a memory location where the payload is stored.

13. The apparatus of claim 9 wherein the representation of the payload comprises a result of a cyclic redundancy check (CRC) calculation of the payload.

14. The apparatus of claim 13 wherein the representation of the payload also comprises an indication of the size of the payload.

15. The apparatus of claim 9 wherein the memory unit comprises a cache.

16. A method for use in a data compression device which includes a memory unit, comprising:
    receiving data packets attributable to a plurality of data packet flows destined for different devices, respectively, in an application level multicast (ALM) of material to be shared with the different devices;
    recording in the memory unit a plurality of payloads of selected ones of the data packets; and
    determining whether the memory unit has therein a record of an identical version of a payload of a received data packet;
    recording the payload of the received data packet in the memory unit if it is determined that the memory unit has therein no record of an identical version of the payload; and
    replacing the payload of the received data packet with a representation of the payload if it is determined that the memory unit has therein a record of an identical version of the payload.

17. The method of claim 16 wherein the material is shared in accordance with a collaborative application.

18. The method of claim 16 wherein at least one of the plurality of payloads is recorded in the memory unit using at least a result of a hash calculation of the at least one payload.

19. The method of claim 18 wherein the hash calculation comprises a cyclic redundancy check (CRC) calculation.

20. The method of claim 18 wherein the at least one payload is recorded in the memory unit using also the size of the at least one payload.

* * * * *